(12) United States Patent
Liang

(10) Patent No.: US 8,445,794 B2
(45) Date of Patent: May 21, 2013

(54) STYLUS

(75) Inventor: Shi-Xu Liang, Shenzhen (CN)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 426 days.

(21) Appl. No.: 12/819,290

(22) Filed: Jun. 21, 2010

(65) Prior Publication Data

US 2011/0155480 A1  Jun. 30, 2011

(51) Int. Cl.
G06K 11/06 (2006.01)
G06F 3/033 (2006.01)

(52) U.S. Cl.
USPC ........................................ 178/19.01; 345/179

(58) Field of Classification Search
None
See application file for complete search history.

(56) References Cited

U.S. PATENT DOCUMENTS

| 6,464,419 | B1 * | 10/2002 | Chan | 401/131 |
| 8,284,174 | B2 * | 10/2012 | Liang | 345/179 |
| 2003/0184529 | A1 * | 10/2003 | Chien et al. | 345/179 |
| 2008/0166175 | A1 * | 7/2008 | Pittel et al. | 401/195 |
| 2009/0122029 | A1 * | 5/2009 | Sin | 345/179 |

* cited by examiner

Primary Examiner — K. Wong
(74) Attorney, Agent, or Firm — Altis Law Group, Inc.

(57) ABSTRACT

A stylus comprises a housing, a tip body, a slide enabling member and a cap assembly. The housing has a receptacle defined therethrough. The tip body is slidably accommodated in the receptacle of the housing. The slide enabling member slidably couples the tip body to the housing so the tip body can slide relative to the housing from a retracted position to an extended position. The cap assembly is releasably latched to the tip body. The tip body includes a tapered surface formed thereon; the cap assembly includes a resisting portion which is complemented in shape and size to resist the tapered surface of the tip body; when an external force is exerted on the cap assembly toward the housing, the resisting portion push the tapered surface so the tip body slides relative to the housing from the extended position to the retracted position.

19 Claims, 6 Drawing Sheets

STYLUS

BACKGROUND

1. Technical Field

This exemplary disclosure generally relates to writing implements, and particularly to retractable/extendable styluses.

2. Description of Related Art

A variety of devices include a touch screen. Examples of such devices include smart phones, personal digital assistants (PDA), pagers, personal organizers, and the like. These devices typically include a display module under the touch screen. The display module generates target images associated with menu options, programs, user choices, and other operations. The user controls the device by pressing the touch screen over the target image with a stylus. However, typical styluses have no a effective cap for protecting them.

Therefore, there is room for improvement within the art

BRIEF DESCRIPTION OF THE DRAWINGS

Many aspects of the exemplary stylus can be better understood with reference to the following drawings. The components in the various drawings are not necessarily drawn to scale, the emphasis instead being placed upon clearly illustrating the principles of the exemplary stylus. Moreover, in the drawings, like reference numerals designate corresponding parts throughout the diagrams.

DETAILED DESCRIPTION

In this exemplary embodiment, the stylus is used to contact a touch screen display of an electronic device such as a mobile telephone. The mobile telephone described herein is a representation of the type of wireless communication device that may benefit from the exemplary embodiment. However, it is to be understood that the exemplary embodiment may be applied to any type of hand-held or portable device including, but not limited to, the following devices: radiotelephones, cordless phones, paging devices, personal digital assistants, portable computers, pen-based or keyboard-based handheld devices, remote control units, portable media players (such as an MP3 or DVD player) that have wireless communication capability and the like. Accordingly, any reference herein to the mobile telephone should also be considered to apply equally to other portable wireless electronic devices.

Figure 1:
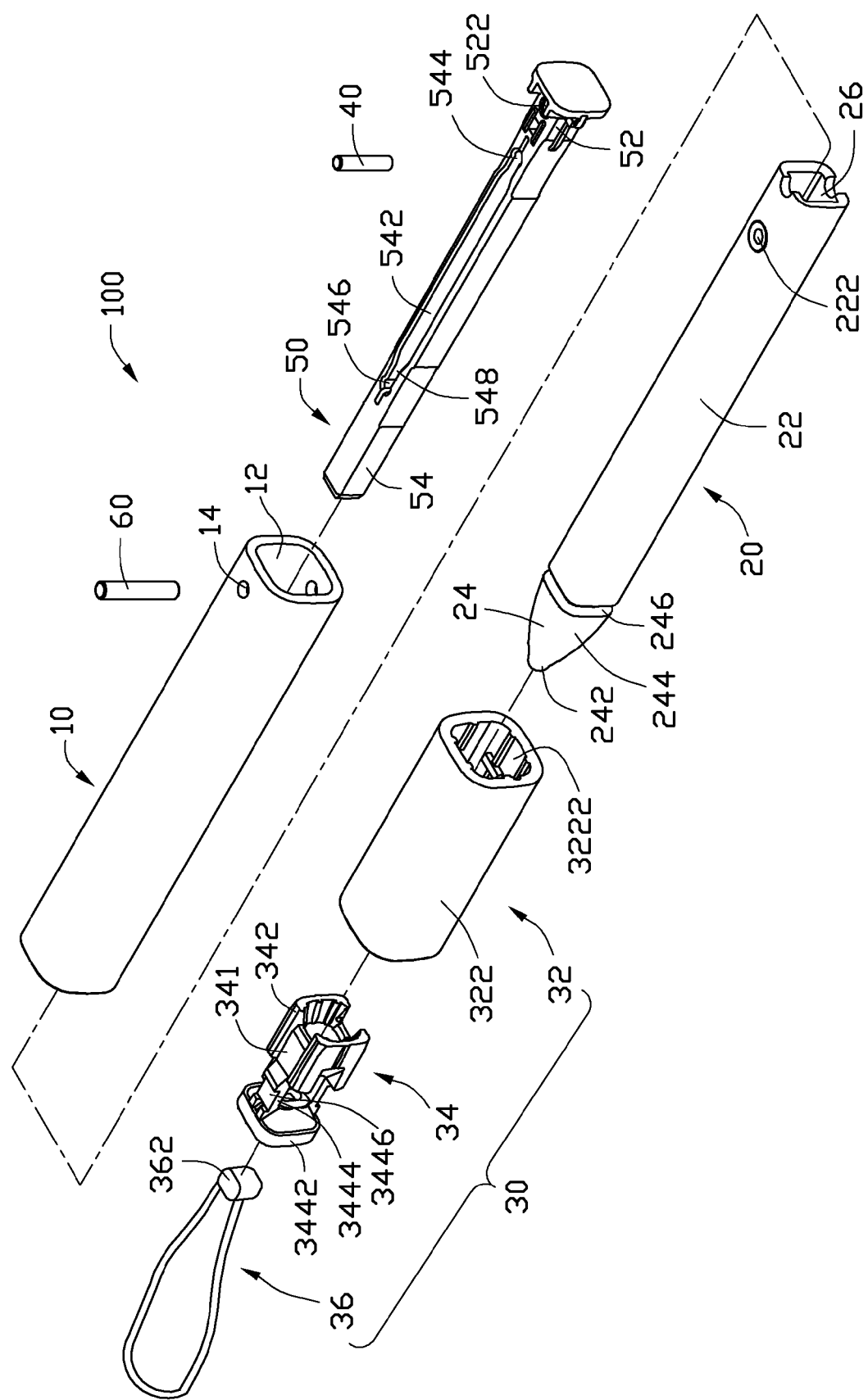
FIG. 1 is an exploded view of an exemplary stylus.
Figure 2:
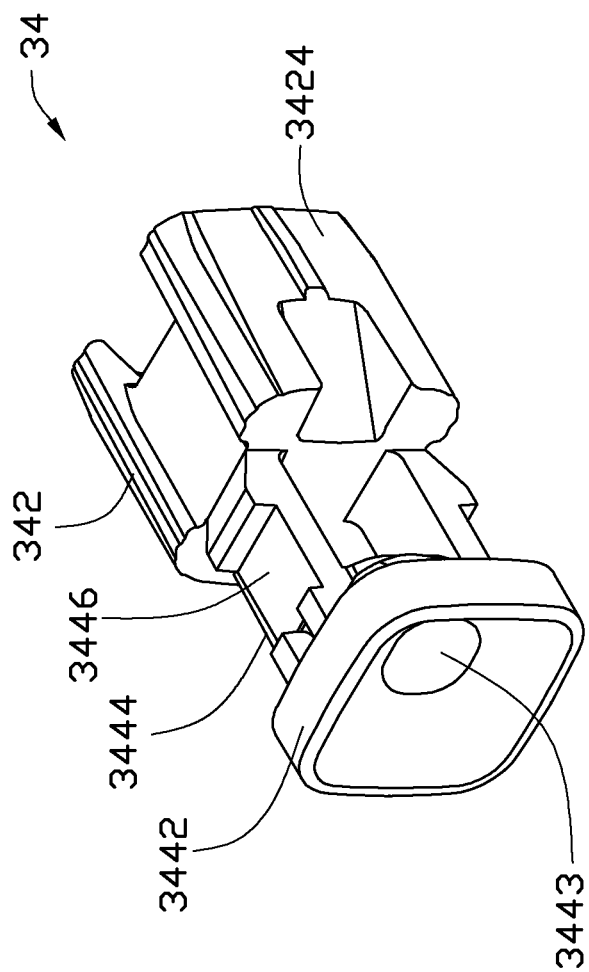
FIG. 2 is a partially enlarged view of a receiving element of the exemplary stylus shown in FIG. 1.
Figure 3:
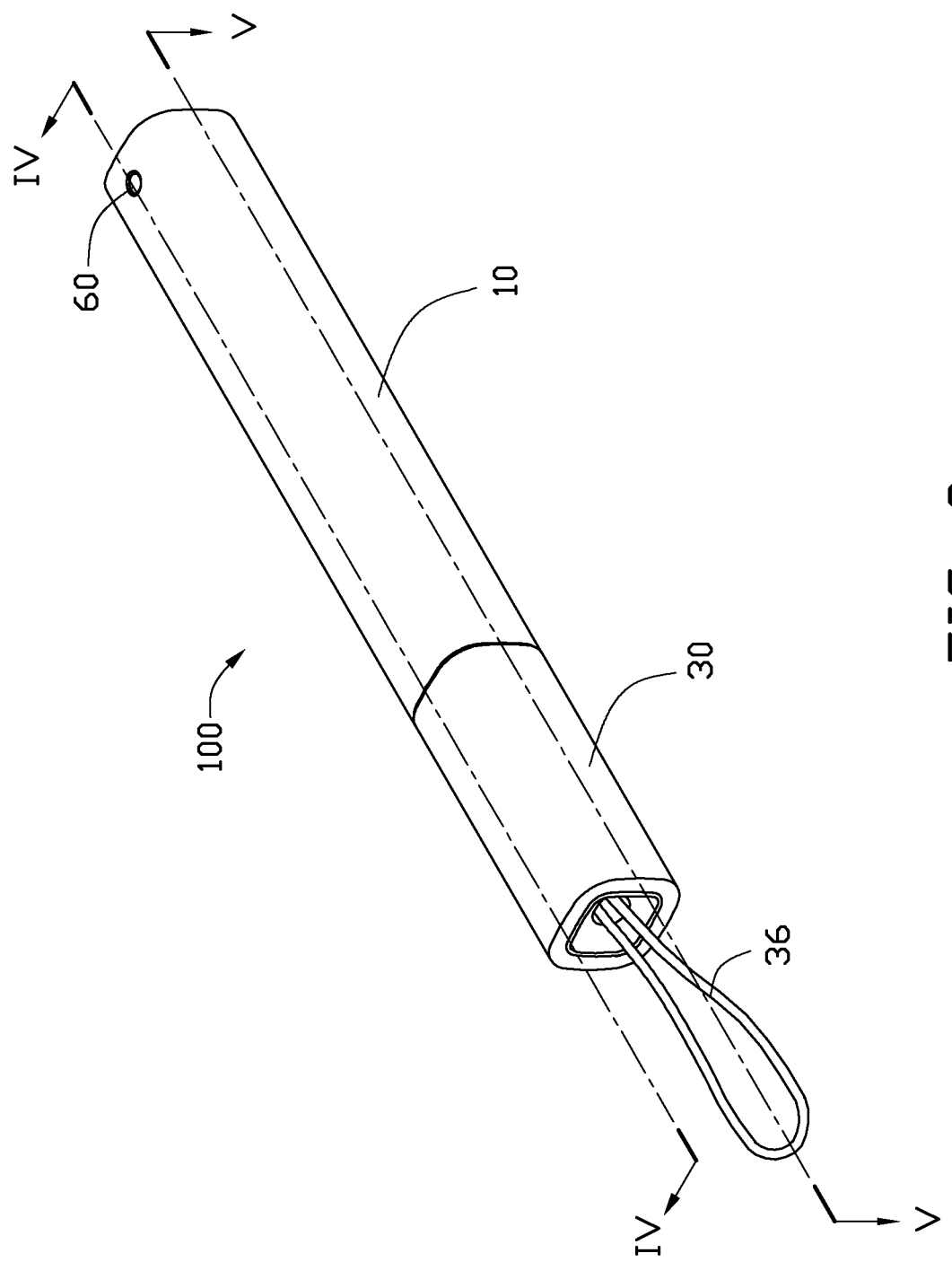
FIG. 3 is an assembled view of the stylus shown in FIG. 1.
Figure 4:
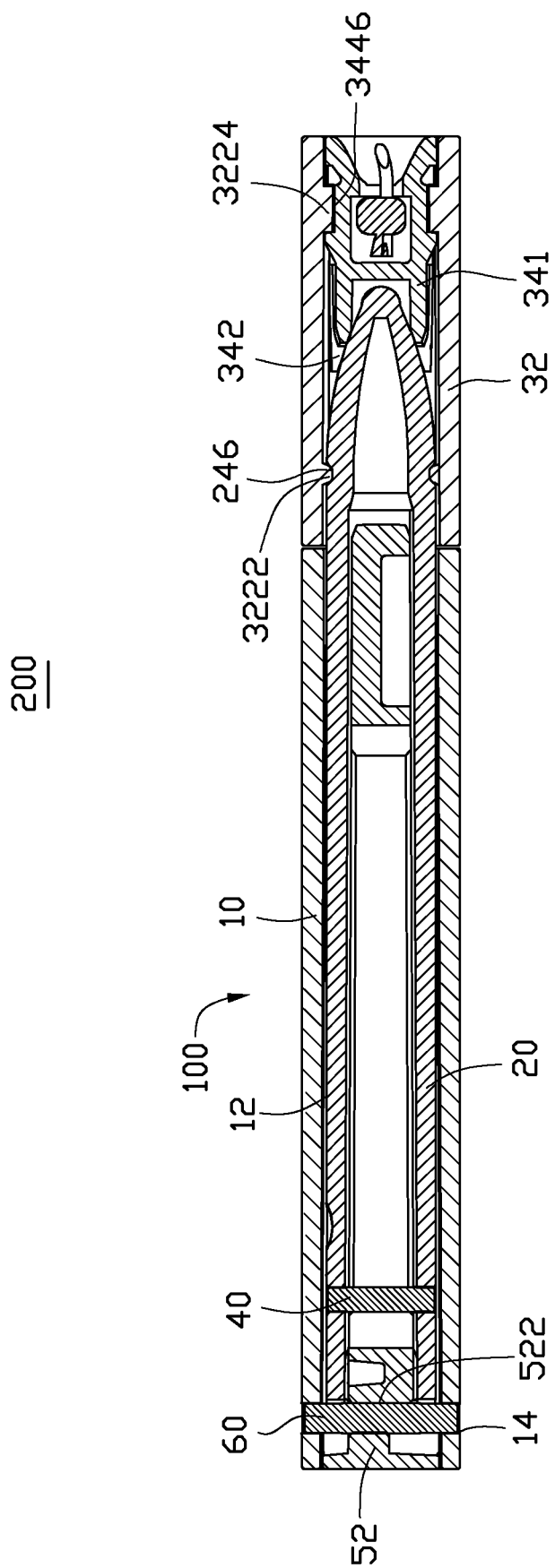
FIG. 4 is a cross-sectional view of the stylus shown in FIG. 3 along the line IV-IV.

Referring to FIGS. 1 and 4, a stylus 100 includes a housing 10, a tip body 20 and a cap assembly 30. The tip body 20 is retractably accommodated in the housing 10 by a slide enabling member (not labeled), and the cap assembly 30 covers and protects the tip body 20.

The housing 10 is tubular and of any suitable manufacture, and may for example be constructed of a light weight metal such as stainless steel or aluminum alloy. The housing 10 is hollow, having a receptacle 12 defined longitudinally therethrough.

The tip body 20 be of any suitable manufacture, and may for example be constructed of a lightweight metal such as stainless steel or aluminum alloy. The tip body 20 is received within the receptacle 12 of the housing 10 and partially extends out of the housing 10. The tip body 20, in this exemplary embodiment, may include a body 22 and a head 24 which protrudes from one end of the body 22. The body 22 has the same shape as, but slightly smaller than, the receptacle 12 of the housing 10, so the body 22 can be slidably fitted in the receptacle 12 of the housing 10.

Figure 5:
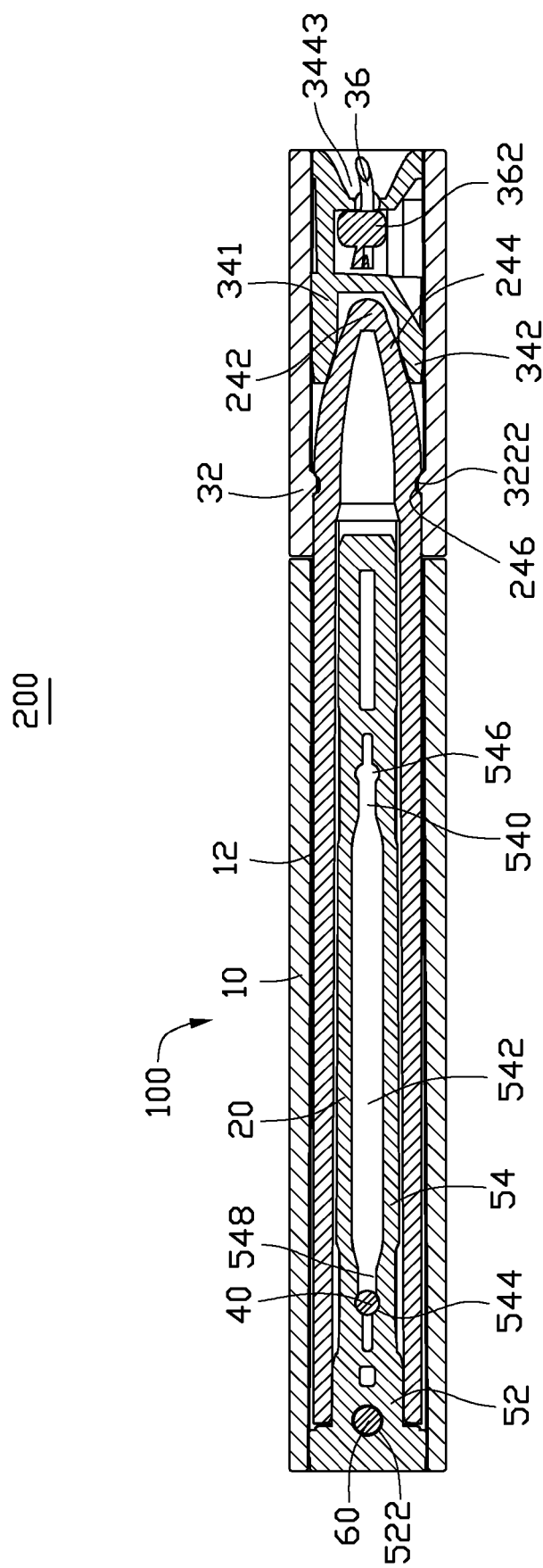
FIG. 5 is a cross-sectional view of the stylus shown in FIG. 3 along the line V-V.
Figure 6:
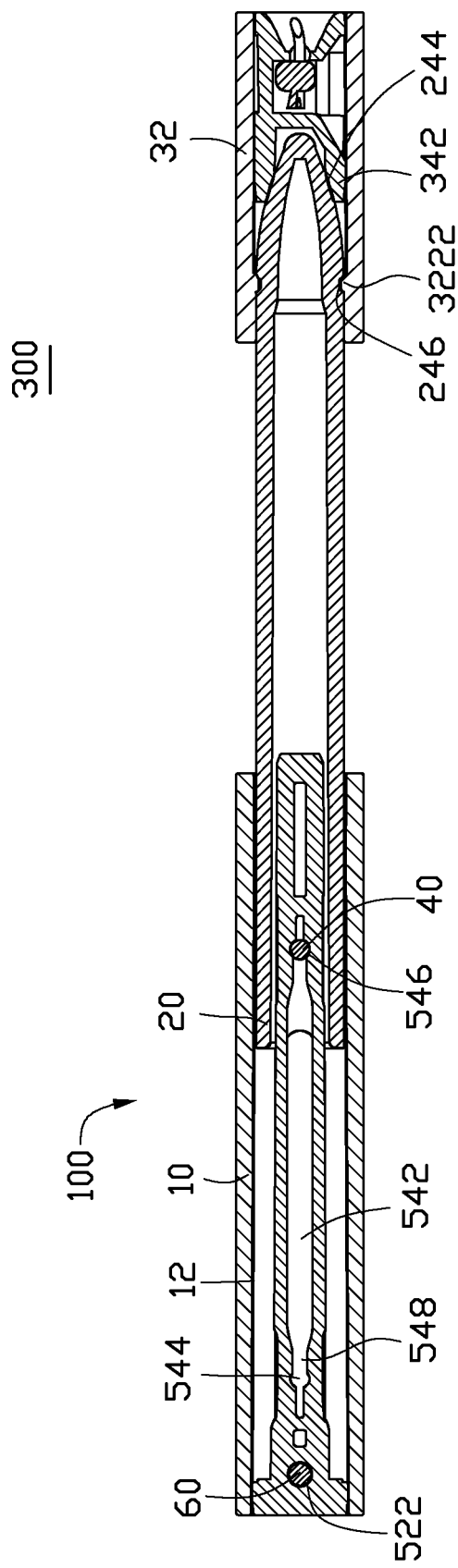
FIG. 6 is similar to the FIG. 5, and wherein the stylus is in an extended position.

Referring to FIGS. 1, 4 and 5, the slide enabling member is for enabling the tip body 20 to slidably engage the housing 10 from a closed/retracted position 200 shown in FIGS. 4 and 5 to an extended position 300 shown in FIG. 6. The slide enabling member, in this exemplary embodiment, may include a sliding pin 40 and a track 542 that engages the sliding pin 40. The sliding pin 40 is positioned in two aligned holes 222 of the tip body 20 and the track 542 which is a guiding groove defined in a guiding element 50 that is located in the receptacle 12 of the housing 10. The guiding element 50 includes a retaining portion 52 and a guiding portion 54 extending from one end of the retaining portion 52. The retaining portion 52 may be retained on the housing 10 in such a way that the retaining portion 52 has a retaining hole 522 defined therethrough, the housing 10 has two aligned housing holes 14, and a retaining pin 60 is tightly fitted in the retaining hole 522 and the housing holes 14 so the guiding element 50 is retained on the housing 10. The sliding pin 40 is slid in the track 542 when the tip body 20 slides relative to the housing 10. The tip body 20 further includes a chamber 26 longitudinally defined therein for accommodating the guiding portion 54 of the guiding element 50 when tip body 20 is retracted in the receptacle 12 of the housing 10 like shown in FIG. 5. It is understood that one of ordinary skill in the art would appreciate the slide enabling member that comprises the sliding pin 40 and the track 542 are one example. It is also understood that the sliding pin 40 may be carried on either the tip body 20 or the housing 10 and the sliding pin engaging members (e.g. track 542) may be carried on the element that the sliding pin 40 are not carried on.

The slide enabling member further includes a first stopping hole 544 and a second stopping hole 546 that are located respectively at opposites ends of the track 542 and communicate with the track 542. The first/second stopping hole 544, 546 are configured to respectively hold the tip body 20 in the retracted configuration 200 or the extended configuration 300. The first/second stopping hole 544, 546 are defined through the guiding portion 54 and respectively communicate with the track 542 by a slit 548 located between the first/second stopping hole 544, 546 and the track 542. The first stopping hole 544 is sized and dimensioned to tightly fit the sliding pin 40 therein when the tip body 20 is slid to the retracted configuration 200 shown in FIG. 5, and the second stopping hole 546 is sized and dimensioned to tightly fit the sliding pin 40 therein when the tip body 20 is slid to the extended configuration 300 shown in FIG. 6. The slits 548 are smaller than the sliding pin 40 so the sliding pin 40 can not freely slide out of the first/second stopping hole 544, 546 when the sliding pin 40 is fit in the first/second stopping hole 544, 546. Thus, the tip body 20 can be firmly held in the retracted configuration 200 and the extended configuration 300 by the tight fit engagement between the first/second stopping hole 544, 546 and the sliding pin 40.

The tip body 20 further includes a retaining slot 246 defined in an outer surface thereof between the body 22 and the head 24. The cap assembly 30 includes a hollow cap 32 which has a peripheral wall 322 with a protrusion 3222 protruding from an inner surface thereof. The protrusion 3222 corresponds with the retaining slot 246. The protrusion 3222 is rested in the retaining slot 246 while the cap 32 is cover on the head 24, firmly holding the cap 32 on the head 24 to protect the head 24. In this exemplary embodiment, the latching force between the protrusion 3222 and the retaining slot 246 is larger than the latching force between the first stopping hole 544 and the sliding pin 40, so when an external force is exerted on the cap 32 to remove the cap 32 away from the housing 10, the sliding pin 40 would be slid out of the first stopping hole 544 with the cap 32 firmly latched on the head of the tip body 20, thus causing the body 22 of the tip body 20 to slide relative to the housing 10. Additionally, the latching force between the protrusion 3222 and the retaining slot 246 is smaller than the latching force between the second stopping hole 546 and the sliding pin 40, so when an external force is exerted on the cap 32 to remove the cap 32 away from the housing 10, the protrusion 3222 would be slid out of the retaining hole 522 but the sliding pin 40 is firmly latched in the second stopping hole 546, thus causing the cap 32 to remove from the tip body 20. Then, the tip body 20 is firmly located in the extended position 300 shown in FIG. 6 and is ready to use.

The tip body 20 further includes a tip 242 used to contact a touch screen display of an electronic device and a tapered surface 244 defined between the tip 242 and the retaining slot 246. The cap assembly 30 further includes a receiving element 34 mounted in the cap 32. The receiving element 34, in this exemplary embodiment, may includes a receiving portion 341 which is a tubular member for accommodating the tip 242 of the tip body 20 and a resisting portion 342 which is complementary in shape and size to resist the tapered surface 244 of the tip body 20. The resisting portion 342 protrudes from one end of the receiving portion 341. When the cap 32 covers on the head 24 of the tip body 20, the tip 242 of the tip body 20 is accommodated in the receiving portion 341 and the resisting portion 342 resist the tapered surface 244 of the tip body 20. Referring to FIG. 6, when an external force is exerted on the cap 32 toward the housing 10, the resisting portion 342 push the tapered surface 244 of the tip body 20 to overcome the latching force between the second stopping hole 546 and the sliding pin 40, until the sliding pin 40 is slid out of the second stopping hole 546, thereby the tip body 20 is then slid toward the retraction position 200 shown in FIG. 5 along the track 542.

The cap assembly 30 further includes a retaining structure (not labeled) for retaining the receiving element 34 in the cap 32. The retaining structure is illustrated in FIG. 4. The retaining structure, in this exemplary embodiment, includes a set of latching slots 3446 and a set of latching blocks 3224 that engage the latching slots 3446. The latching slots 3446 are respectively defined in two opposite planar boards 3444 protruding from another end of the receiving portion 341. The latching blocks 3224 protrude from the inner wall of the cap 32 corresponding to the latching slots 3446. The latching blocks 3224 are latched in the latching slots 3446 to hold the receiving element 34 in the cap 32. It is understood that one of ordinary skill in the art would appreciate the retaining structure that comprises the latching slots 3446 and the latching blocks 3224 only are one example. It is also understood that the latching slots 3446 may be carried on either the receiving element 34 or the cap 32 and the latching slot engaging members (e.g. latching blocks 3224) may be carried on the element that the latching slots 3446 are not carried on.

The cap assembly 30 further includes a rope 36 positioned at a retaining board 3442 that is located on a distal end of each planar board 3444. The rope 36 is used to facilitate removing of the cap 32 from the tip body 20. The rope 36, in this exemplary embodiment, may be retained on the retaining board 3442 in such a way that the retaining board 3442 has an aperture 3443 defined therethrough, the rope 36 extend into the aperture 3443 with a node 362 formed thereon, and the node 362 is wider than the aperture 3443 so the rope 36 is unreleasably engaged in the aperture 3443 thereby retaining the rope 36 to the retaining board 3442.

Referring to FIGS. 1, 4-6, to assemble the stylus 100, the guiding portion 54 is first inserted in the chamber 26 of the tip body 20, the holes 222 of the tip body 20 are aligned with the second stopping hole 544 of the guiding element 50. The sliding pin 40 is then inserted into the holes 222 and the second stopping hole 544, and the sliding pin 40 is tightly fitted in the holes 222 so the sliding pin 40 is retained on the tip body 20. The guiding element 50 is inserted into the receptacle 12 of the housing 10, the retaining hole 522 is aligned with the housing holes 14 of the housing 10. The retaining pin 60 is then inserted into the housing holes 14 and the retaining hole 522, and the retaining pin 60 is tightly fitted in the retaining hole 522 and the housing holes 14 so guiding element 50 is mounted to the housing 10. The rope 36 is then inserted in the aperture 3443 of the retaining board 3442 until the node 362 of the rope 36 resisting the retaining board 3442. The receiving element 34 is then inserted into the cap 32 until the latching blocks 3224 of the cap 32 are latched in the latching slots 3446 of the receiving element 34. Thereby, the cap 32, the receiving element 34 and the rope 36 are assembled into the cap assembly 30. Finally, the cap assembly 30 is cover on the head 24 of the tip body 20 with the protrusion 3222 accommodated in the retaining slot 246, to complete assembly of the stylus 100.

Referring to FIGS. 5 and 6, in operation, the rope 36 of the cap assembly 30 is removed from the housing 10 under an external force, until the sliding pin 40 is slid out of the first stopping hole 544. The sliding pin 40 is then slide in the track 542 of the guiding element 50 toward the second stopping hole 546. Once the sliding pin 40 is positioned in the second stopping hole 546, as mentioned above: the latching force between the second stopping hole 546 and the sliding pin 40 is larger than the latching force between the protrusion 3222 and the retaining slot 246, thereby the protrusion 3222 would be slid out of the retaining slot 246 to removing of the cap 32 from the tip body 20 under the external force so the stylus 100 is ready to use.

It is to be further understood that even though numerous characteristics and advantages of the exemplary embodiments have been set forth in the foregoing description, together with details of structures and functions of various embodiments, the disclosure is illustrative only, and changes may be made in detail, especially in matters of shape, size, and arrangement of parts within the principles of the exemplary invention to the full extent indicated by the broad general meaning of the terms in which the appended claims are expressed.

What is claimed is:

1. A stylus, comprising:
a housing having a receptacle defined therethrough;
a tip body slidably accommodated in the receptacle of the housing;
a slide enabling member slidably coupling the tip body to the housing, wherein the slide enabling member includes a sliding pin, a track, a first stopping hole, a second stopping hole, and two slits, the sliding pin is located at one of the tip body and the housing, and the track is defined at the other of the tip body and the housing; the first stopping hole is located at a first end of the track and communicate with the track by one of the slits, and the second stopping hole is located at a second end of the track and communicate with the track by the other one of the slits; the sliding pin slidably engages with the track and selectively and tightly fits in one of the first stopping hole and the second stopping hole; and a cap assembly releasably latched to the pen;

wherein a latching force between the tip body and the cap assembly is larger than a latching force between the first stopping hole and the sliding pin, the latching force between the tip body and the cap assembly is smaller than the latching force between the second stopping hole and the sliding pin so the sliding pin is capable of sliding from the first stopping hole to the second stopping hole and held in the second stopping hole when exerting a pulling force on the cap assembly.

2. The stylus as claimed in claim 1, wherein the sliding pin is positioned on the tip body and the track which is a guiding groove defined in a guiding element that is located in the receptacle of the housing.

3. The stylus as claimed in claim 1, wherein the tip body includes a retaining slot defined at an outer surface thereof, the cap assembly includes a hollow cap which has a protrusion protruding from an inner surface thereof; the protrusion is latched in the retaining slot while the cap is covering an end of the tip body; the latching force between the protrusion and the retaining slot is larger than the latching force between the first stopping hole and the sliding pin, the latching force between the protrusion and the retaining slot is smaller than the latching force between the second stopping hole and the sliding pin.

4. The stylus as claimed in claim 3, wherein the tip body includes a tapered surface formed thereon; the cap assembly further includes receiving element mounted in the cap; the receiving element includes a resisting portion which is complemented in shape and size to resist the tapered surface of the tip body; when an external force is exerted on the cap assembly toward the housing, the resisting portion push the tapered surface of the tip body to overcome the latching force between the second stopping hole and the sliding pin, until the sliding pin is slid out of the second stopping hole.

5. The stylus as claimed in claim 4, wherein the tip body includes a body and a head protruding from one end of the body, the tapered surface is formed on the head.

6. The stylus as claimed in claim 5, wherein the tip body further includes a tip formed on a distal end of the head, the receiving element further includes a receiving portion protruding from the resisting portion; the receiving portion is a tubular member for accommodating the tip of the tip body.

7. The stylus as claimed in claim 6, wherein the cap assembly further includes a retaining structure for retaining the receiving element in the cap.

8. The stylus as claimed in claim 7, wherein the retaining structure includes a set of latching slots and a set of latching blocks that engage the latching slots.

9. The stylus as claimed in claim 8, wherein the latching slots are respectively defined in opposite planar boards protruding from the receiving portion, the latching blocks protrude from the inner wall of the cap corresponding to the latching slots, the latching blocks are latched in the latching slots to hold the receiving element in the cap.

10. The stylus as claimed in claim 9, wherein the cap assembly further includes a rope positioned at a retaining board located on a distal end of each planar board, the rope facilitating removal of the cap from the tip body.

11. The stylus as claimed in claim 10, wherein the rope is retained on the retaining board in such a way that the retaining board has an aperture defined therethrough, the rope extends into the aperture with a node formed thereon, and the node is wider than the aperture so the rope is unreleasably engaged in the aperture.

12. The stylus as claimed in claim 1, wherein the width of the slits are less than the diameter of the sliding pins.

13. A stylus, comprising:

a housing having a receptacle defined therethrough;

a tip body slidably accommodated in the receptacle of the housing a slide enabling member configured for enabling the tip body slidably coupled to the housing so the tip body can slide relative to the housing from a retracted position to an extended position, wherein the slide enabling member includes a sliding pin, a track, a first stopping hole, a second stopping hole, and two slits, the sliding pin is located at one of the tip body and the housing, and the track is defined at the other of the tip body and the housing; the first stopping hole is located at a first end of the track and communicate with the track by one of the slits, and the second stopping hole is located at a second end of the track and communicate with the track by the other one of the slits; the sliding pin slidably engages with the track and selectively and tightly fits in one of the first stopping hole and the second stopping hole; and a cap assembly releasably latched to the tip body;

wherein when the tip body is in the retracted position, the sliding pin is fit in the first stopping hole, and the latching force between the first stopping hole and the sliding pin is smaller than the latching force between the cap assembly and the pen; when the tip body is in the extended position, the sliding pin is fit in the second stopping hole, and the latching force between the second stopping hole and the sliding pin is larger than the latching force between the cap assembly and the pen.

14. The stylus as claimed in claim 13, wherein the sliding pin is positioned on the tip body and the track which is a guiding groove defined in a guiding element that is located in the receptacle of the housing.

15. The stylus as claimed in claim 13, wherein the tip body includes a retaining slot defined at an outer surface thereof, the cap assembly includes a hollow cap which has a protrusion protruding from an inner surface thereof; the protrusion is latched in the retaining slot while the cap covers the tip body; the latching force between the protrusion and the retaining slot is larger than the latching force between the first stopping hole and the sliding pin, the latching force between the protrusion and the retaining slot is smaller than the latching force between the second stopping hole and the sliding pin.

16. The stylus as claimed in claim 15, wherein the tip body includes a tapered surface formed thereon; the cap assembly further includes receiving element mounted in the cap; the receiving element includes a resisting portion which is complemented in shape and size to resist the tapered surface of the tip body; when an external force is exerted on the cap assembly toward the housing, the resisting portion push the tapered surface of the tip body to overcome the latching force between the second stopping hole and the sliding pin, until the sliding pin is slid out of the second stopping hole.

17. The stylus as claimed in claim 16, wherein the tip body includes a body and a head protruding from one end of the body, the tapered surface is formed on the head.

18. The stylus as claimed in claim 17, wherein the tip body further includes a tip formed on a distal end of the head, the receiving element further includes a receiving portion protruding from the resisting portion; the receiving portion is a tubular member for accommodating the tip of the tip body.

19. The stylus as claimed in claim 13, wherein the width of the slits are less than the diameter of the sliding pins.

* * * * *